United States Patent [19]
Sensi

[11] Patent Number: 4,746,347
[45] Date of Patent: May 24, 1988

[54] PATTERNED FLOAT GLASS METHOD

[75] Inventor: John E. Sensi, Arnold, Pa.

[73] Assignee: PPG Industries, Inc., Pittsburgh, Pa.

[21] Appl. No.: 29

[22] Filed: Jan. 2, 1987

[51] Int. Cl.⁴ .............................................. C03B 18/06
[52] U.S. Cl. ........................................ 65/94; 65/99.5;
65/182.4
[58] Field of Search ................ 65/98, 99.1, 99.3, 99.4,
65/99.5, 182.1, 182.3, 182.4, 182.5

[56] References Cited
U.S. PATENT DOCUMENTS

| | | | |
|---|---|---|---|
| 3,241,937 | 3/1966 | Michalik et al. | 65/84 |
| 3,432,283 | 3/1969 | Galey | 65/99 |
| 3,472,641 | 10/1969 | Gray | 65/60 |
| 3,558,294 | 1/1971 | Touvay | 65/51 |
| 3,672,859 | 6/1972 | Claassen | 65/93 |
| 3,749,563 | 7/1973 | Stingelin | 65/91 |
| 3,850,605 | 11/1974 | Maltman et al. | 65/30 |
| 3,951,633 | 4/1976 | Danihel | 65/23 |
| 4,074,994 | 2/1978 | Glikman et al. | 65/44 |
| 4,395,272 | 7/1983 | Kunkle et al. | 65/99.5 |

Primary Examiner—Arthur Kellogg
Attorney, Agent, or Firm—Dennis G. Millman

[57] ABSTRACT

Patterned float glass is produced without distorting patterns imparted to the surface by forming the glass by a process that avoids deformation of the glass subsequent to the pattern imparting step.

9 Claims, 1 Drawing Sheet

PATTERNED FLOAT GLASS METHOD

BACKGROUND OF THE INVENTION

This invention relates to imprinting patterns on flat glass as it is being produced by the float process. More particularly, the invention relates to producing regular, distinct patterns without distorting the patterns.

The float process, in which molten glass is shaped into a flat ribbon as it passes along a pool of molten metal such as tin, has become the predominant technique for commercially producing flat glass. The process is adapted to producing glass surfaces having a polished appearance. Patterned glass does not require the quality surface finish provided by the float process, and, therefore, patterned glass is generally made by a rolling technique. Providing a separate facility for the exclusive production of rolled pattern glass can be difficult to justify economically in view of the relatively small market for patterned glass. It would be desirable if a float glass line could be modified to produce patterned glass during limited time periods while producing standard float glass the majority of the time.

Various proposals have been made in the prior art for creating patterns or otherwise modifying the surface of float glass during the forming process. U.S. Pat. Nos. 3,672,859 (Classen), 3,951,633 (Danihel) and 4,074,994 (Glikman et al.) disclose modifying the surface textures of glass ribbons in float forming chambers to produce random patterns. Because the patterns are random, the subsequent stretching of the glass ribbon that is part of the usual float forming operation does not have an objectional effect on the patterns. In fact, the Classen and Glikman patents cite this stretching as being useful in producing random surface effects. But for a distinctly shaped pattern, the distorting of this pattern would be objectionable. In U.S. Pat. No. 3,472,641 (Gray) distinct patterns are imparted to float glass by gas jets, and in U.S. Pat. No. 3,850,605 (Maltman et al.) discrete colored areas are created in float glass. In both of these it appears that the patterns would be subject to distortion by the inherent subsequent stretching of the glass ribbon, but no solution to this problem is disclosed.

U.S. Pat. No. 3,558,294 (Touvay) uses a roller to press wires into a float glass ribbon. It is disclosed that the temperature is such that the impressions made by the roller are subsequently leveled.

Patterned glass can also be made by etching or grinding patterns into individual sheets of glass after they have been formed. That approach, however, is labor intensive and, therefore, costly.

It would be desirable for an economical technique to be available for creating distinct patterns in float glass without subsequent distortion of the patterns.

SUMMARY OF THE INVENTION

By means of the present invention, distinct patterns may be imprinted into the surface of float glass as it is being formed, and subsequent distortion of the patterns is avoided. Distortion of an imprinted pattern is a result of the conventional operation of the float process whereby a substantial part of the force for stretching the glass into a ribbon of the desired dimensions is provided by traction forces of the conveyor rolls on the glass in the annealing lehr downstream from the float forming chamber. This traction is transmitted through the ribbon to the region in the forming chamber where the ribbon viscosity is such as to allow the ribbon to be elongated and thus, reduced in thickness. The glass viscosity required for imprinting patterns on the surface of the ribbon is in the range where the longitudinal stretching also occurs. Therefore, an imprinted pattern is subject to being elongated shortly after being imparted to the glass.

In the present invention this dilemma is avoided by employing a float forming technique that does not require longitudinal stretching at the region where surface imprinting is performed nor downstream therefrom. In U.S. Pat. No. 4,395,272 (Kunkle et al.) there is disclosed a process for forming glass by a modified float technique in which elevated pressure is employed to reduce the glass thickness. The desired glass thickness may be established in a pressurized zone, and thereafter the dimensions of the ribbon may be merely maintained by edge gripping means until the glass cools sufficiently to be self-sustaining. Some longitudinal stretching could be performed in this cooling zone as disclosed in the patent, but for purposes of the present invention, attenuation of the glass is completed in the pressurized zone, and substantially no longitudinal stretching is subsequently applied to the ribbon by lehr traction or any other means. In other words, the speed of the ribbon is kept constant downstream from the pressurized zone.

In the pressure forming process, the glass ribbon is formed at relatively high temperatures; therefore, the glass in the initial portions of the cooling section are sufficiently high to permit imprinting of a pattern on the surface. A rotating printing element is preferred for impressing the pattern into the glass, but the gas jet means of U.S. Pat. No. 3,472,641 (Gray) may be used instead. Also, the creation of colored patterns such as taught by U.S. Pat. No. 3,850,605 (Maltman et al.) or by depositing coloring materials onto the glass surface will also benefit from the present invention.

THE DRAWINGS

DETAILED DESCRIPTION

Figure 1:
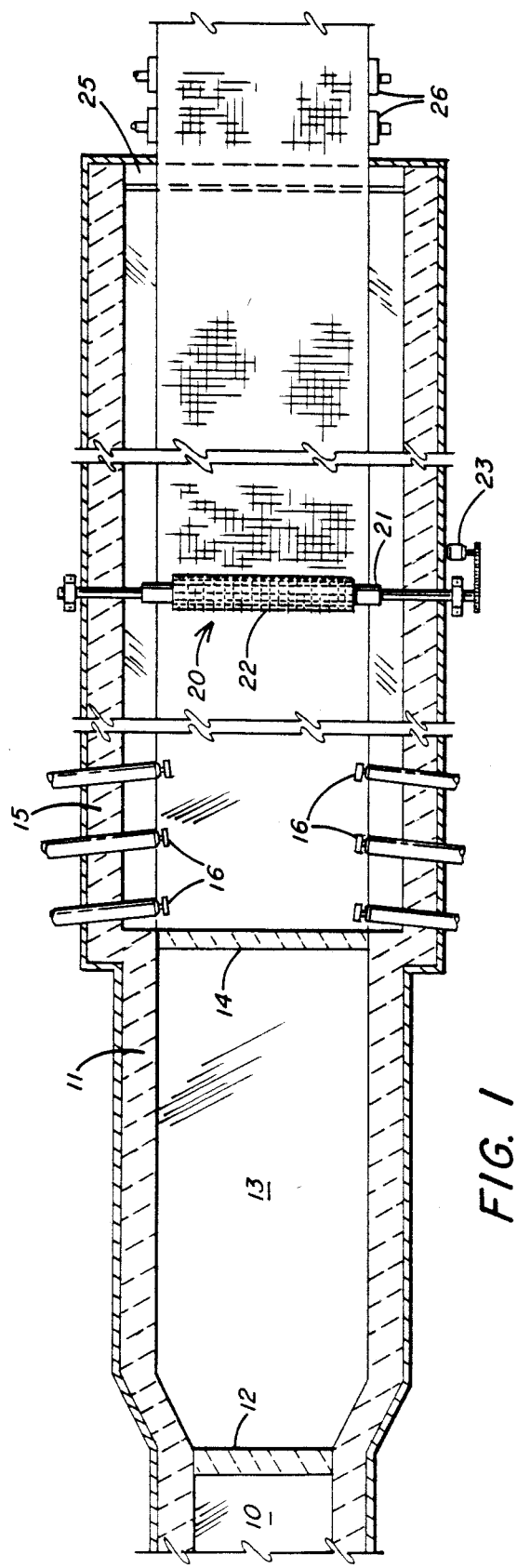
FIG. 1 is a plan view of a float forming chamber with the top cut away, adapted to make patterned float glass in accordance with the present invention.
Figure 2:
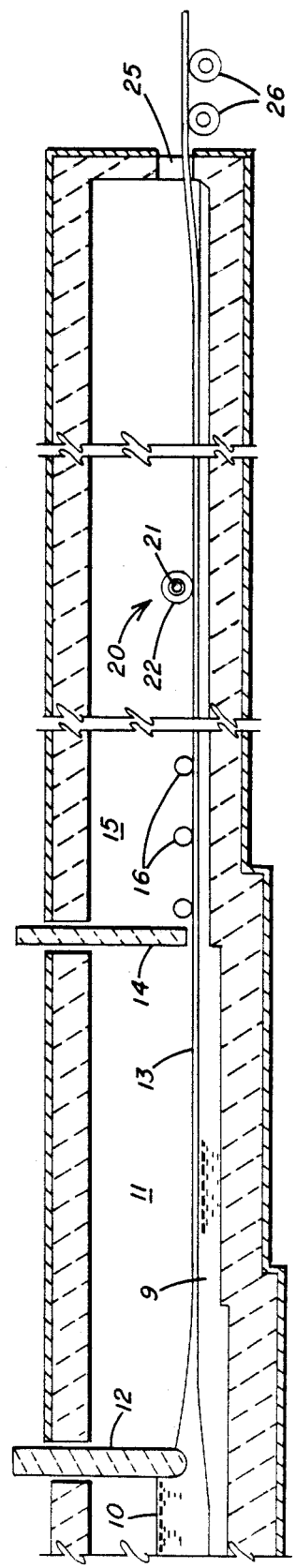
FIG. 2 is a vertical cross-section of the float forming chamber of FIG. 1.

A central feature of the present invention is that patterns are created in float glass in a system in which the glass is not subjected to longitudinal stretching subsequent to imprinting of the pattern. This is contrary to the conditions in a conventional float forming process, and thus, the invention calls for a particular type of forming process. A type of float forming process that does not rely on longitudinal stretching from the lehr traction forces for attenuating the glass is the pressure sizing technique wherein pressure greater than atmospheric is applied to the glass so as to achieve the thickness desired. That type of process is disclosed, for example, in U.S. Pat. Nos. 3,241,937 (Michalik et al.), 3,432,283 (Galey) and 3,749,563 (Stingelin), and any of those could be operated in a manner consistent with the principles of the present invention. But the preferred pressure sizing arrangement is that disclosed in U.S. Pat. No. 4,395,272 (Kunkle et al.), the disclosure of which is hereby incorporated by reference. FIGS. 1 and 2 here show a float forming chamber of the type disclosed by the Kunkle et al. patent, modified in accordance with the present invention. All of the pressure sizing techniques mentioned above could be operated with or without significant longitudinal force from lehr traction, but for the present invention those forces are maintained sufficiently small to avoid longitudinally deforming the glass ribbon after the patterns have been imparted thereto. This is accomplished by controlling the ribbon speed through the lehr in coordination with the rate at which the glass ribbon exits from the pressurized zone so as to avoid longitudinal deformation of the glass downstream from the pattern imprinting location.

An example of a preferred embodiment is illustrated in FIGS. 1 and 2. Molten glass 10 from a source such as a melter and/or refiner (not shown) is metered into a pressurized chamber 11 by means of a tuile (or "tweel") 12 that is vertically adjustable. In this embodiment the glass advantageously spreads into contact with the side walls of the pressure chamber 11, and the glass 13 thereby attains approximately the width and thickness of the final glass ribbon. The glass is supported on a pool of molten metal 9, preferably tin, in the chamber 11, and the molten metal pool may extend upstream into the delivery region under the tweel 12 if desired. In the pressure chamber 11 the glass is at a relatively high temperature compared to conventional float processes, generally entering the chamber at a temperature of at least 2100° F. (1150° C.) and exiting at about 1800° F. (980° C.) to 1900° F. (1040° C.). These temperatures are for standard soda-lime-silica float glass compositions. The pressure within the chamber depends upon the thickness of glass being produced, generally on the order of a few millimeters of water column barometric pressure above atmospheric.

The downstream end of the pressurized chamber 11 is closed by a vertically adjustable exit seal 14, the bottom edge of which is spaced a small distance above the top surface of the glass so as to minimize escape of pressurized gas from the pressurized chamber. As the glass 13 passes under the seal 14, it enters a cooling zone 15 in which a pressure lower than that in the pressurized chamber is maintained, preferably substantially atmospheric. The glass separates from the side walls as it enters the cooling zone 15. The glass ribbon has at this point substantially its final dimensions, but upon encountering the reduced pressure in the cooling zone 15, the ribbon has a tendency to shrink in width and increase in thickness as long as its temperature remains high enough for the glass to be in a plastic state. Therefore, ribbon width may be maintained by edge roll means 16, for example, until the glass has cooled sufficiently. Since no significant reduction in glass thickness is performed downstream from the seal 14, and because there is very little friction between the glass and the molten metal, only a very small longitudinal force need be applied to the ribbon to convey it through the remainder of the forming chamber, which is insufficient to induce any substantial longitudinal deformation of the ribbon.

In order to imprint a pattern into the glass surface, the glass must be in a deformable condition. At higher temperatures it is easier to penetrate the glass with the imprinting tool, but the viscosity of the glass may be sufficiently low to permit flow of the glass that may at least partially obliterate the pattern. At lower temperatures the imprinting may be more difficult and may require longer contact time, but retention of the impression is more likely.

Choosing the temperature at which the imprinting is carried out would depend upon various factors such as the particular type of pattern and the depth of impression required. Glass is withdrawn from the float chamber at about 1100° F. (600° C.), at which temperature it is able to withstand contact with solid conveying means, and the imprinting will be done at somewhat higher temperatures, usually above 1300° F. (700° C.) and preferably above 1400° F. (760° C.). The glass is generally too soft to hold an imprint at 1900° F. (1040° C.), so the imprinting will usually be done at temperatures below 1800° F. (980° C.) and preferably below 1700° F. (930° C.). An optimum range has been found to be 1500° F. (810° C.) to 1600° F. (870° C.). The imprinting means 20 will accordingly be located an appropriate distance downstream from the seal 14 and upstream from the exit of the forming chamber to be in the desired temperature regime.

The imprinting means may take a variety of forms, a preferred embodiment as shown in the drawings being comprised of a rotatably mounted mandrel 21 on which is carried a cylindrical sleeve 22 of material suitable for glass contact such as graphite. The sleeve 22 is provided with projections corresponding to the pattern to be imprinted. The pattern shown as an example is a square grid. The mandrel 21 may be driven by motor means 23 to provide the sleeve 22 with a tangential velocity equal to the velocity of the glass ribbon so as to prevent any drag on the ribbon. Even though the glass is deformable at the location of the imprinting means, the lehr force is maintained sufficiently low to avoid any significant deformation of the ribbon in the direction of travel. Therefore, a pattern such as the square shown remains undisturbed, with straight lines and right angles for example.

The mandrel may be provided with cooling means to maintain the printing surface cool enough to avoid adhesion of the glass to the surface, but cooling is not considered necessary under the preferred operating conditions. If desired, the cooling could be provided by passage of gas (preferably nitrogen) or liquid (such as water) through the mandrel, with conduits for the cooling fluid being connected to the mandrel by rotary unions (not shown). Nitrogen coolant may be permitted to escape into the forming chamber. Alternatively, the surface of the sleeve 22 may be cooled by providing a stationary cooling pipe or the like extending transversely across the forming chamber near the sleeve so that the surface of the sleeve passes near the cooler as the sleeve rotates.

The ribbon continues to cool as it moves toward the exit 25 from the forming chamber. At the exit, the glass may be lifted from the molten metal pool by conventional lift-out rolls 26, after which the glass ribbon may be passed through an annealing lehr (not shown).

Whenever production of pattern glass is to be ceased, the imprinting means may be disengaged from contact with the glass, and the forming chamber may be used to produce standard glazing quality float glass.

The invention has been described in connection with a particular embodiment, but it should be apparent that other variations and modifications as would be known to those skilled in the art may be resorted to without departing from the spirit and scope of the claims that follow.

I claim:

1. A method of making patterned float glass comprising: forming molten glass into a flat glass ribbon while supported on a pool of molten metal, attenuating the glass ribbon to substantially its final thickness, imparting a pattern to the attenuated ribbon by deforming upper surface portions of the ribbon while the viscosity of the glass is sufficient to retain the pattern and while the ribbon remains on the molten metal, after imparting the pattern to the ribbon drawing the ribbon along the molten metal pool with substantially constant speed so as to minimize stretching, thereby maintaining the pattern undistorted, and withdrawing the patterned ribbon from the molten metal pool.

2. The method of claim 1 wherein the glass is attenuated to a predetermined thickness by imposing pressure greater than atmospheric.

3. The method of claim 2 wherein the glass attains substantially its final width and thickness prior to imparting the pattern to the glass.

4. The method of claim 1 wherein the pattern is imparted to the glass surface by impressing a solid member into the surface.

5. The method of claim 4 wherein the solid member is rotated in contact with a moving ribbon of glass.

6. The method of claim 1 wherein the pattern includes distinct shapes.

7. The method of claim 4 wherein the pattern is imprinted into the glass at a temperature between 1300° F. (700° C.) and 1800° F. (980° C.).

8. The method of claim 7 wherein the imprinting is carried out at a temperature between 1400° F. (760° C.) and 1700° F. (930° C.).

9. The method of claim 7 wherein the imprinting is carried out at a temperature between 1500° F. (810° C.) and 1600° F. (870° C.).

* * * * *